(12) United States Patent
Ochi

(10) Patent No.: US 10,338,804 B2
(45) Date of Patent: Jul. 2, 2019

(54) DISPLAY INPUT DEVICE, IMAGE FORMATION DEVICE COMPRISING SAME, AND CONTROL METHOD FOR DISPLAY INPUT DEVICE

(71) Applicant: KYOCERA Document Solutions Inc., Osaka (JP)

(72) Inventor: Makoto Ochi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 77 days.

(21) Appl. No.: 15/543,337

(22) PCT Filed: Dec. 15, 2015

(86) PCT No.: PCT/JP2015/085099
§ 371 (c)(1),
(2) Date: Jul. 13, 2017

(87) PCT Pub. No.: WO2016/125401
PCT Pub. Date: Aug. 11, 2016

(65) Prior Publication Data
US 2018/0004387 A1 Jan. 4, 2018

(30) Foreign Application Priority Data

Feb. 6, 2015 (JP) .................... 2015-022440

(51) Int. Cl.
*G06F 3/0488* (2013.01)
*G06F 3/041* (2006.01)
*H04N 1/00* (2006.01)

(52) U.S. Cl.
CPC .......... *G06F 3/0488* (2013.01); *G06F 3/0416* (2013.01); *G06F 3/04883* (2013.01); *H04N 1/00381* (2013.01); *B60K 2350/1032* (2013.01)

(58) Field of Classification Search
CPC .. G06F 3/0488; G06F 3/04883; G06F 3/0416; H04N 1/00381; B60K 2350/1032
See application file for complete search history.

(56) References Cited

U.S. PATENT DOCUMENTS

2006/0007469 A1  1/2006 Uruma .................... 358/1.14
2006/0050291 A1  3/2006 Morikawa et al. .......... 358/1.13
(Continued)

FOREIGN PATENT DOCUMENTS

JP    2006-21501 A    1/2006
JP    2006-80855 A    3/2006
(Continued)

OTHER PUBLICATIONS

Japanese Office Action dated Apr. 27, 2018, issued by the Japanese Patent Office in corresponding application JP 2016-573202.
(Continued)

*Primary Examiner* — Mark W Regn
(74) *Attorney, Agent, or Firm* — Stein IP, LLC

(57) ABSTRACT

A display input device including: a display panel provided for the display panel; and a control unit that recognizes user operation content, recognizes a drag operation whereby a predetermined start area in the display panel is touched and, while said touch is continued, the touch position is slid towards a predetermined end area, recognizes arrival at the touch position end area as a power supply OFF command that instructs a power supply to turn OFF, and causes processing for turning off the power supply when a power supply OFF command is recognized.

9 Claims, 9 Drawing Sheets

(56) References Cited

U.S. PATENT DOCUMENTS

2009/0199093 A1* 8/2009 Chakravarty ..... G06F 17/30265
                                                    715/273
2012/0026534 A1   2/2012 Uruma ......................... 358/1.14
2013/0285954 A1* 10/2013 Takahashi ............. G06F 3/0412
                                                    345/173

FOREIGN PATENT DOCUMENTS

| JP | 2010-183244 A | 8/2010 |
| JP | 2012-155743 A | 8/2012 |
| JP | 2014-85980 A  | 5/2014 |
| JP | 2014-177024 A | 9/2014 |

OTHER PUBLICATIONS

"IPhone 5s & iPhone 5c Genius Guide".

* cited by examiner (1) COMBINATION A
START → UPPER EDGE
END → LOWER EDGE (2) COMBINATION B
START → LOWER EDGE
END → UPPER EDGE (3) COMBINATION C
START → LEFT EDGE
END → RIGHT EDGE (4) COMBINATION D
START → RIGHT EDGE
END → LEFT EDGE

FIG.11

| STATUS CONFIRMATION | | | |
|---|---|---|---|
| STATUS | | HISTORY | |

JOB TYPE [ALL  v]

| NO. | JOB | STATUS | JOB NAME |
|---|---|---|---|
| 1001 | COPY 1 | STOPPED DUE TO ERROR | doc000000000000001 |
| 1002 | COPY 2 | STANDBY | doc000000000000002 |
| 1003 | SCAN TRANSMISSION | STANDBY | scan00000000000001 |
| 1004 | PRINTER 1 | STANDBY | doc000000000000003 |
| 1005 | PRINTER 2 | STANDBY | doc000000000000004 |

— 11, 12
— S3

[SUSPEND ALL PRINTING JOBS] [CANCEL] [PRIORITY PRINTING] [RAISE PRIORITY] [DETAIL]

PRINTING JOB / TRANSMISSION JOB / STORAGE JOB / DEVICE / COMMUNICATION / PAPER SHEET / CONSUMABLES

K2

DISPLAY INPUT DEVICE, IMAGE FORMATION DEVICE COMPRISING SAME, AND CONTROL METHOD FOR DISPLAY INPUT DEVICE

CROSS-REFERENCE TO RELATED APPLICATIONS

This application is a national stage of International Application No. PCT/JP2015/085099 filed Dec. 15, 2015, which claims the benefit of Japanese Application No. 2015-022440, filed Feb. 6, 2015, in the Japanese Property Office, the disclosure of which are incorporated herein in their entireties by reference.

TECHNICAL FIELD

The present invention relates to accepting a power-off command at a display input device mounted in an image formation device.

BACKGROUND ART

Generally, a power switch for turning on/off main power is provided in an image formation device such as a multi-functional peripheral, a copy machine, a printer, or a facsimile machine. The power switch may be provided on an operation panel mounted in the image formation device. When turning on/off power to the image formation device, a user operates the power switch on the operation panel. Patent Document 1 describes one example of an operation panel including such a power switch and an image formation device.

Specifically, Patent Document 1 describes a digital multi-functional peripheral 102 (an image processing device) having, as a power switch, a mechanical hard key or a soft switch provided on a device side surface or a display operation portion thereof (see Patent Document 1: paragraph [0092]). Further, in the image processing device described in Patent Document 1, an operation state of the device and information inputted from the operation portion are displayed. Upon a user issuing a command to shut off power from the operation portion, information on a job being executed and a job(s) on standby is displayed, and a shut-down confirmation screen that prompts the user to make an input as to whether or not to execute power shutoff is displayed, and upon the user making an input to execute power shutoff on the shutdown confirmation screen, a shut-down execution screen that provides notification of execution of power shutoff is displayed on a display portion. By this configuration, information on a job currently being executed and a job(s) on standby is displayed, and upon a user making an input to execute power shutoff in that state, the power shutoff is executed (see Patent Document 1: claim 1 and paragraph [0015]).

LIST OF CITATIONS

Patent Literature

Patent Document 1: JP-A-2006-021501

SUMMARY OF THE INVENTION

Technical Problem

As a power-related switch (a power switch), a hard key may be provided on an operation panel of an image formation device. Alternatively, the power switch may be displayed in the form of a soft key on a display panel equipped with a touch panel. Further, a user operates the hard key or the soft key as the power switch to turn off power to the image formation device (the operation panel).

In a case, however, where such a hard key is provided as the power switch for performing power-off, there is a problem that it is necessary to provide the hard key while securing a space for installation and wiring. There is also a problem that the power switch itself leads to a cost increase. Furthermore, the hard key may be provided at a difficult-to-find and unnoticeable location such as on a side surface or a back surface of the image formation device. This requires the user to look for the location of the hard key, which could hardly be found, thus causing inconvenience to the user.

There are numerous types of screens displayed on the display panel of the operation panel. In a case where the power switch is provided in the form of a soft key, in order to allow power-off to be performed anytime, the soft key must be displayed on all the screens. That is, a part of a display region is occupied always by the power switch. Hence, there is also a problem that a display area of the display region of the display panel is substantially decreased by an area occupied by the soft key provided as the power switch.

A technique described in Patent Document 1 includes a power switch provided in the form of a hard key or a soft key and involves the above-described problems.

The present invention has been made in view of the above-described problems with conventional techniques and is to allow power to be easily shut down simply by performing an operation with respect to a touch panel, without requiring that a soft key as a power switch be kept always displayed.

Solution to the Problem

In order to solve the above-described problems, a display input device according to claim 1 includes a display panel, a touch panel portion, and a control portion. The display panel displays a setting screen and keys. The touch panel portion is provided with respect to the display panel. Based on an output of the touch panel portion, the control portion recognizes a content of an operation performed by a user. Further, the control portion recognizes a drag operation in which a touch is made on a predetermined start region in a display region of the display panel, and while the touch is maintained, a touch position is moved in a sliding manner toward a predetermined end region that is distant from the start region. Furthermore, the control portion recognizes, as a power-off command to turn off power, an arrival of the touch position at the end region as a result of continuing the drag operation. Furthermore, upon recognizing the power-off command, the control portion performs control so that processing for power-off is performed.

Advantageous Effects of the Invention

According to the present invention, power can be easily shut down simply by performing an operation with respect to a touch panel, without requiring that a soft key as a power switch be kept always displayed. Furthermore, it is no longer needed to provide a hard key for performing power-off.

BRIEF DESCRIPTION OF DRAWINGS

FIG. 11 is a diagram showing one example of a job detailed list screen displayed on the display panel according to the embodiment.

DESCRIPTION OF EMBODIMENT

With reference to FIG. 1 to FIG. 12, the following describes an embodiment of the present invention. The following description is given using, as an example, a multi-functional peripheral 100 (corresponding to an image formation device) provided with an operation panel 1 (corresponding to a display input device). It should be noted, however, that various factors including a configuration, an arrangement, and so on, which are described in this embodiment, do not limit the scope of the invention thereto and are merely illustrative examples.

(Outline of Multi-Functional Peripheral 100)

Figure 1:
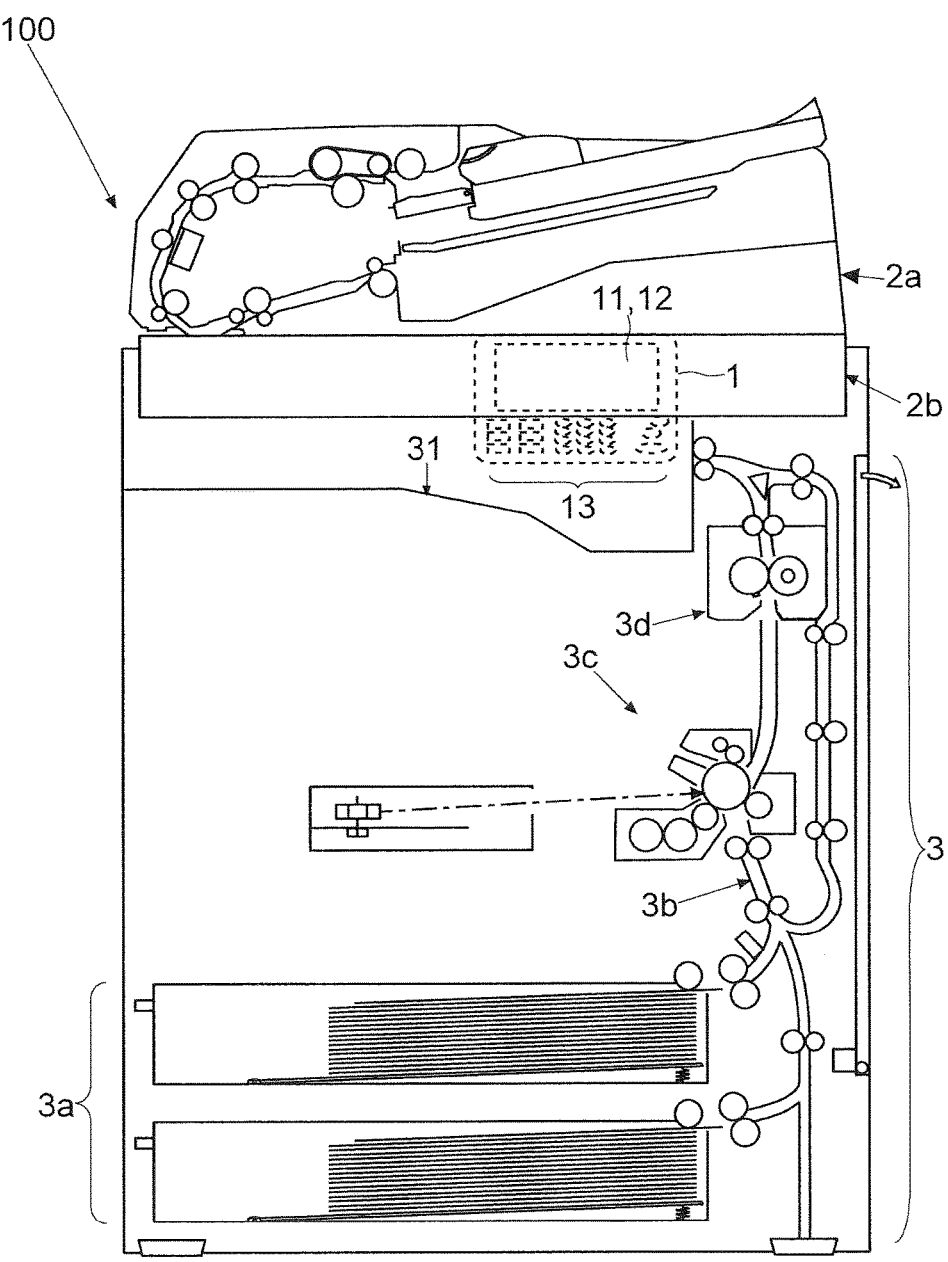
FIG. 1 is a diagram showing one example of a multi-functional peripheral according to an embodiment.
Figure 2:
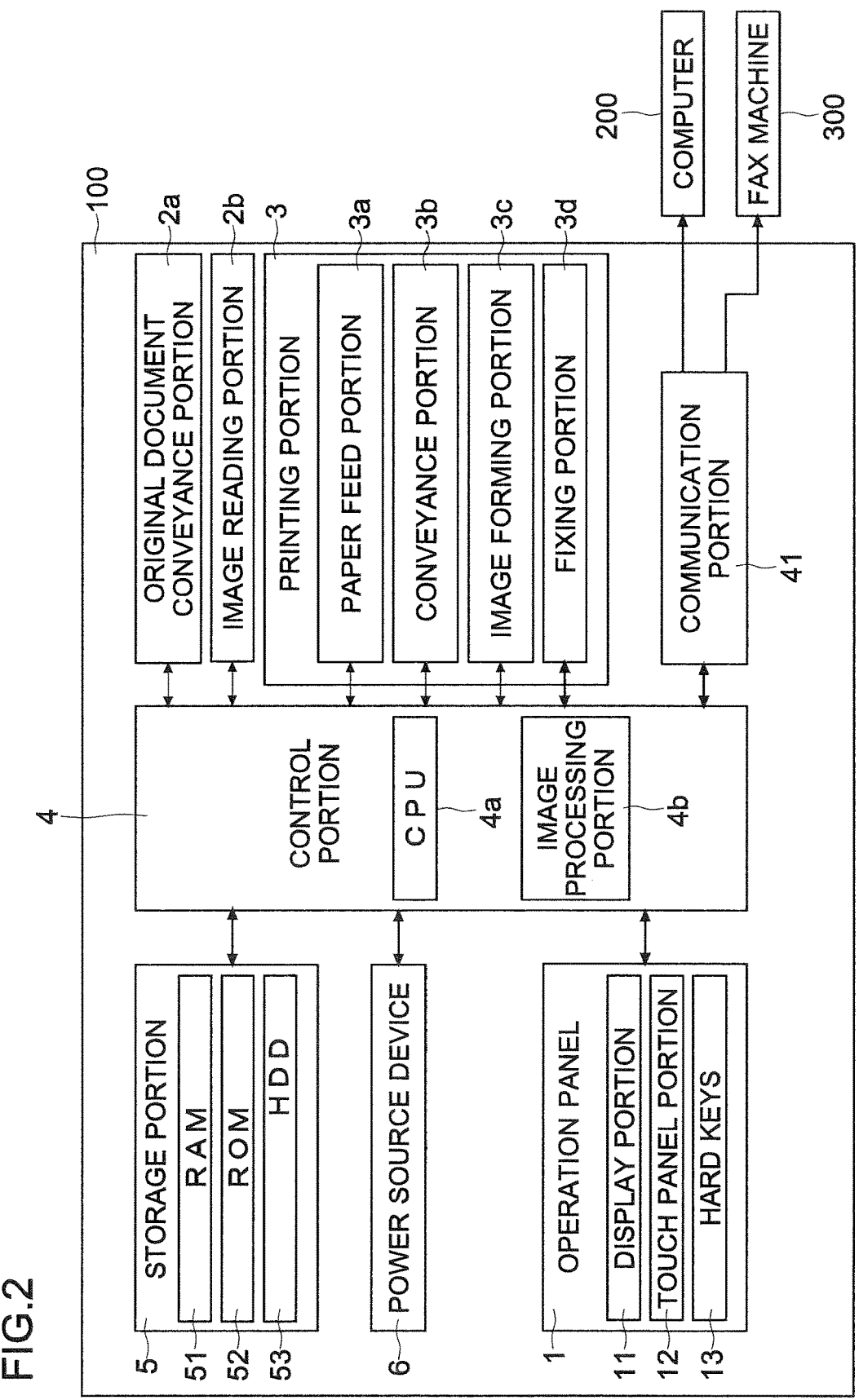
FIG. 2 is a diagram showing the one example of the multi-functional peripheral according to the embodiment.

Based on FIG. 1 and FIG. 2, a description is given of an outline of the multi-functional peripheral 100 according to the embodiment. FIG. 1 and FIG. 2 are diagrams showing one example of the multi-functional peripheral 100 according to the embodiment.

As shown in FIG. 1, the multi-functional peripheral 100 of this embodiment has an operation panel 1 (shown by a broken line) provided on a front surface thereof. Furthermore, an original document conveyance portion 2a and an image reading portion 2b are provided in an upper portion thereof. Furthermore, inside the multi-functional peripheral 100, a printing portion 3 (paper feed portions 3a, a conveyance portion 3b, an image forming portion 3c, and a fixing portion 3d) that performs printing is provided.

The operation panel 1 is provided with a display panel 11 that displays a selection screen for selecting a function (a job type) to be used, an item selection screen for selecting an item related to the selected function, a setting screen of the selected item, a screen such as a soft key for setting a set value, an image, and various types of messages. Furthermore, a touch panel portion 12 is provided with respect to (on an upper surface of) the display panel 11. The touch panel portion 12 detects a position and coordinates of a portion of the display panel 11, which has been operated (touched or pressed) by a user. Based on an output of the touch panel portion 12, a soft key (a button) operated is recognized. Furthermore, hard keys 13 such as a start key and a numeric keypad are also provided on the operation panel 1.

The original document conveyance portion 2a continuously and automatically conveys a placed original document one by one toward a reading contact glass (a reading position, which is not shown). The image reading portion 2b reads an original document placed on an upper surface thereof or an original document conveyed by the original document conveyance portion 2a and generates image data based thereon.

The paper feed portions 3a each house a plurality of paper sheets therein. In executing a printing job, the paper feed portions 3a each feed a paper sheet one by one to the conveyance portion 3b. The conveyance portion 3b conveys a paper sheet supplied from any one of the paper feed portions 3a. The image forming portion 3c forms, based on the image data, a toner image and transfers the toner image on a paper sheet conveyed thereto. The fixing portion 3d fixes the toner image thus transferred on the paper sheet. The paper sheet on which the toner image has thus been fixed is discharged onto a discharge tray 31.

As shown in FIG. 2, a control portion 4 is provided in the multi-functional peripheral 100. The control portion 4 is responsible for performing operation control of the image formation device. The control portion 4 includes circuitry such as a CPU 4a and an image processing portion 4b. The CPU 4a is a central arithmetic processing unit. Based on programs and data stored in a storage portion 5, the CPU 4a performs control of various portions of the image formation device and various types of arithmetic processing. The image processing portion 4b performs image processing of image data to be used for printing or transmission.

The storage portion 5 includes a volatile storage device such as a RAM 51 and non-volatile storage devices such as a ROM 52 and an HDD 53. The storage portion 5 stores various types of data such as control data, setting data, and image data as well as various types of control programs. The storage portion 5 also stores data necessary for executing a job such as copying, printing, scan transmission, box storage, or box printing at least until the job is completed.

Furthermore, the control portion 4 is communicably connected to the operation panel 1. The control portion 4 controls display on the display panel 11. Furthermore, based on an output of the touch panel portion 12 or the hard keys 13, the control portion 4 recognizes a content of an operation performed on the operation panel 1 by a user (an operated one of the soft keys, tubs, and hard keys 13). The control portion 4 functions also as a control portion 4 of the operation panel 1 (the display input device). That is, the multi-functional peripheral 100 includes the operation panel 1 as the display input device provided with the display panel 11, the touch panel portion 12, and the control portion 4. The operation panel 1 may be provided with a panel control portion that, upon receipt of a command from the control portion 4, controls display on the display panel 11, recognizes a content of an operation performed by a user, and performs various types of processing.

Furthermore, the control portion 4 is connected to each of the original document conveyance portion 2a, the image reading portion 2b, and the printing portion 3 via a signal line such as a bus. The control portion 4 recognizes existence of each of various portions and devices. Further, the control portion 4 controls operations of the multi-functional peripheral 100, such as scanning and printing. Furthermore, the control portion 4 is connected to a communication portion 41 provided with various types of connectors, sockets, and communication control chips. Via a network, a public line, or a cable, the communication portion 41 is communicably connected to a computer 200 such as a personal computer or a server and to a fax machine 300.

(One Example of Screen Displayed on Display Panel 11)

Figure 3:
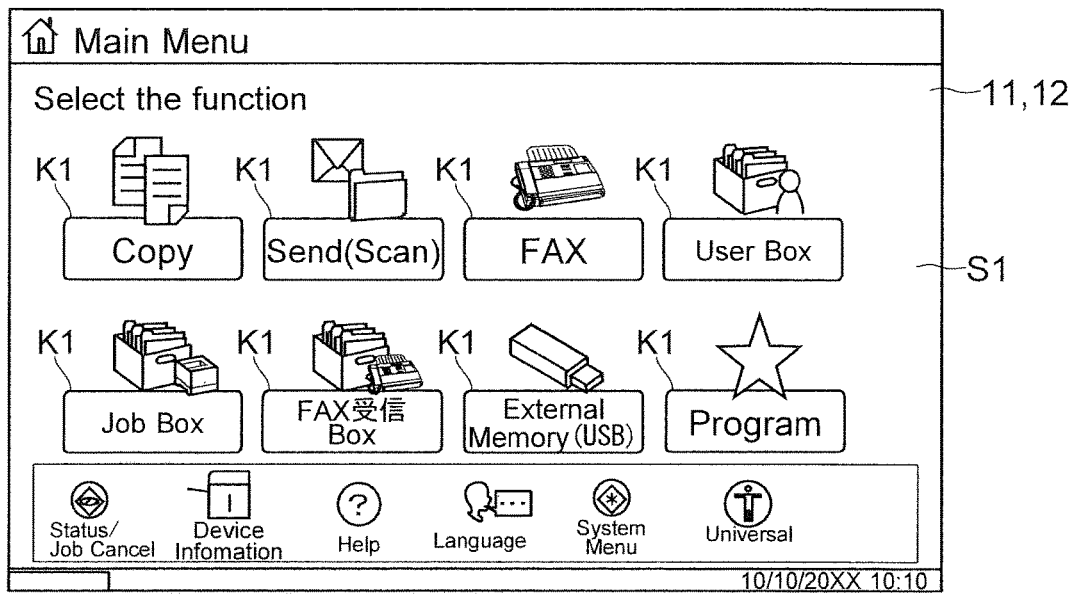
FIG. 3 is a diagram showing one example of a main menu screen displayed on a display panel according to the embodiment.
Figure 4:
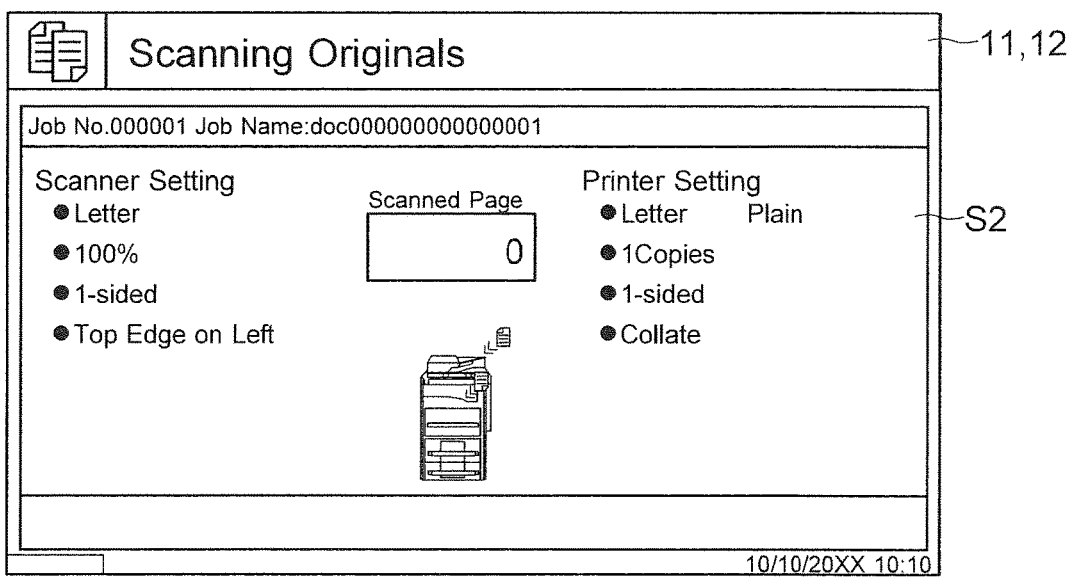
FIG. 4 is a diagram showing one example of a job execution status screen displayed on the display panel according to the embodiment.

Next, with reference to FIG. 3 and FIG. 4, a description is given of one example of a screen displayed on the display panel 11 according to the embodiment. FIG. 3 is a diagram showing one example of a main menu screen S1 displayed on the display panel 11 according to the embodiment. FIG. 4 is a diagram showing one example of a job execution status screen S2 displayed on the display panel 11 according to the embodiment.

The display panel 11 displays various types of screens and setting keys. Data for displaying the various screens is stored in the storage portion 5 or a memory (not shown) in the operation panel 1. Depending on an operation performed with respect to the soft keys and hard keys 13 in a setting screen, the control portion 4 controls the display panel 11 to perform switching of a display screen.

The main menu screen S1 shown in FIG. 3 is a hierarchically top-level screen. When booted up by turning on main power, when a power saving mode is released, or when a job is completed, the control portion 4 controls the display panel 11 to display the main menu screen S1 first. Icons (images) are arranged on the main menu screen S1. Furthermore, function selection keys K1 for selecting a function (a job type) desired to be used are displayed below the icons, respectively. By touching any one of the function selection keys K1, a job type such as copying, scan transmission, box storage, or box printing can be selected.

When attempting to perform a copy job, a user operates one of the function selection keys K1 that is denoted "Copy". When attempting to perform a scan transmission job of transmitting image data based on data obtained by reading an original document, the user operates one of the function selection keys K1 that is denoted "Send (Scan)". When attempting to perform a box storage job of storing, in the storage portion 5 (the HDD 53), image data based on data obtained by reading an original document or a box printing job of performing printing based on image data stored in the storage portion 5, the user operates one of the function selection keys K1 that is denoted "User Box". The control portion 4 controls the display panel 11 to display a screen related to the job thus selected. The user selects an item and sets a set value for the item thus selected so that a desired job result can be obtained.

The execution status screen S2 is a screen that shows an execution status of a job currently being executed. FIG. 4 shows one example of the execution status screen S2 for a copy job. Also for each of other types of jobs such as a print job (printing based on data received from the computer 200), a scan transmission job, a box storage job, and a box printing job, the execution status screen S2 is prepared (a depiction thereof is omitted).

On the execution status screen S2 shown in FIG. 4, on a left side, set values set on the operation panel 1 with regard to reading of an original document to be performed in copying (such as a paper sheet size, a magnification, and so on) are displayed. On the execution status screen S2, on a right side, set values set on the operation panel 1 with regard to printing to be performed in the copying (such as a paper sheet size, the number of paper sheets to be printed, and so on) are displayed. Furthermore, on the execution status screen S2 shown in FIG. 4, in a middle, a field for showing the number of original documents scanned is provided (this may be a field for showing the number of paper sheets printed).

(Start Region F1 and End Region F2)

Figure 5:
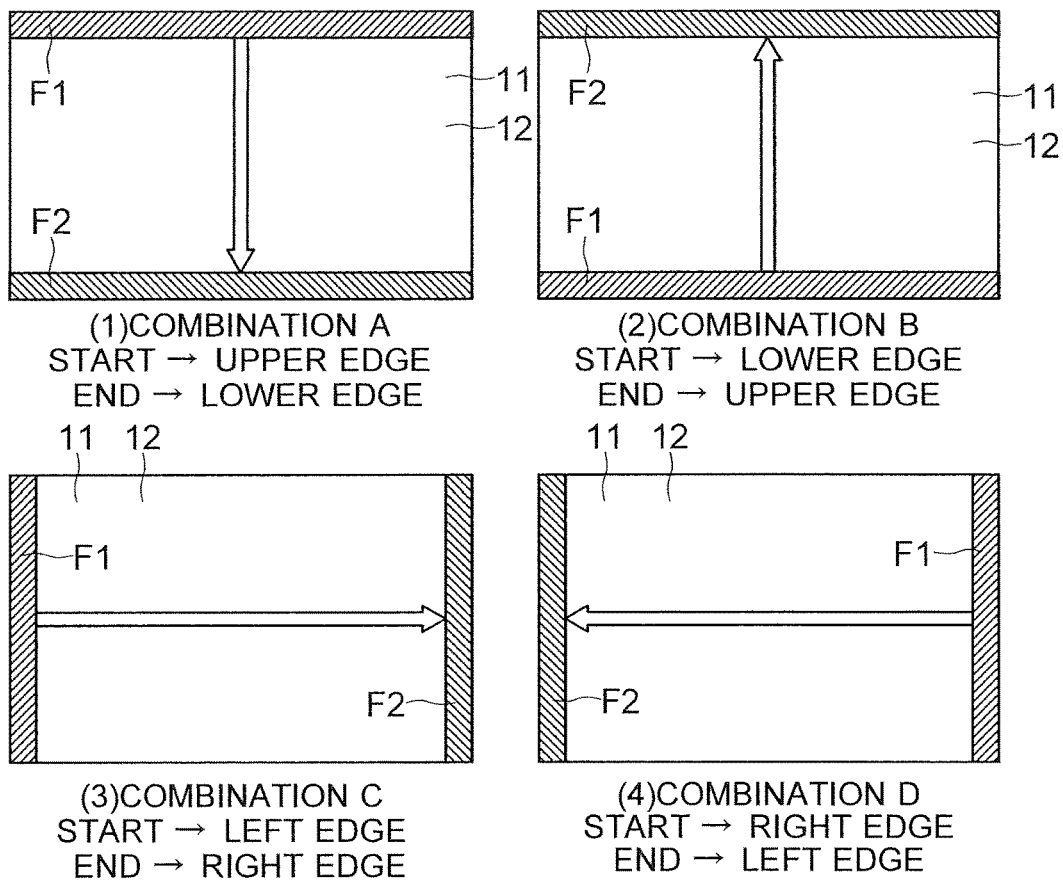
FIG. 5 shows one example of combination patterns of a start region and an end region according to the embodiment.

Next, a description is given of a start region F1 and an end region F2 of this embodiment, which are determined on the operation panel 1. FIG. 5 shows one example of combination patterns of the start region F1 and the end region F2.

In the operation panel 1 (the image formation device), a soft key for shutting down power is not displayed on the display panel 11. Instead, power can be turned off (shut down) by a gesture operation with respect to the touch panel portion 12. Specifically, based on an output of the touch panel portion 12, the control portion 4 recognizes a drag operation in which after a touch is made on the predetermined start region F1, while being maintained, the touch is moved toward a predetermined end region direction. Further, the control portion 4 recognizes, as a power-off command, an operation in which the drag operation is continued and thus a touch position is moved in a sliding manner until it arrives at the end region F2.

In a display region of the display panel 11, a region to be used as the start region F1 and a region to be used as the end region F2 can be determined as appropriate. In the operation panel 1 of this embodiment, a belt-shaped (strip-shaped) region that is in contact with any one of four end sides of the display region of the display panel 11 and extends along an entire length of the any one of four end sides is used as the start region F1. Furthermore, a belt-shaped (strip-shaped) region that is in contact with one of the four end sides of the display region of the display panel 11, which is opposed to the side along which the start region F1 is provided, and extends along an entire length of the opposed side is used as the end region F2. A width of each of the start region F1 and the end region F2 in a direction perpendicular to the sides is set to about one-severalth to one-dozenth of a length of a short side of the display panel 11.

The start region F1 and the end region F2 do not overlap each other. In other words, between the start region F1 and the end region F2, there is provided a region that is neither of the start region F1 and the end region F2. When power-off is performed, a touch position moves from the start region F1 to the region that is neither of the start region F1 and the end region F2 and then to the end region F2.

With reference to FIG. 5, a description is given of combination patterns of the start region F1 and the end region F2. Among combinations shown in FIG. 5, Combination A is a combination in which the start region F1 is provided along an upper end side of the display region, and the end region F2 is provided along a lower end side of the display region. Combination B is a combination in which the start region F1 is provided along the lower end side of the display region, and the end region F2 is provided along the upper end side of the display region. Combination C is a combination in which the start region F1 is provided along a left end side of the display region, and the end region F2 is provided along a right end side of the display region. Combination D is a combination in which the start region F1 is provided along the right end side of the display region, and the end region F2 is provided along the left end side of the display region. A hollow arrow in each of respective drawings of the combinations in FIG. 5 indicates a direction in which a touch position should be slid to turn off power. The start region F1 and the end region F2 are not necessarily required to be in contact with edges of the display region and can be determined as appropriate.

(Display in Case where there is No Unprocessed Job)

Figure 6:
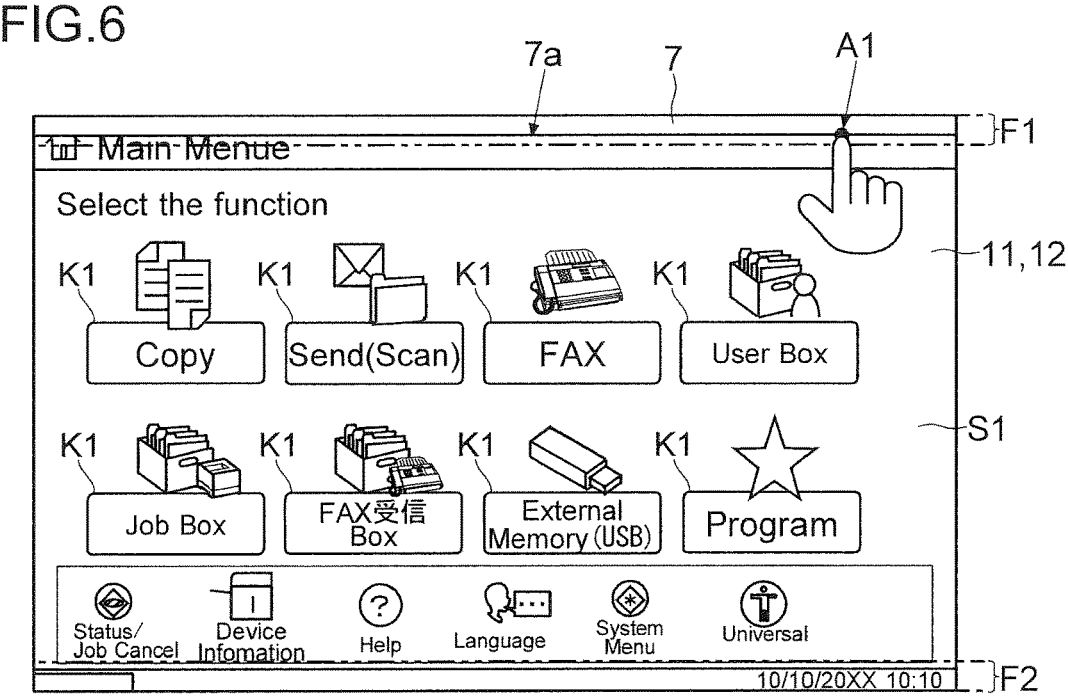
FIG. 6 is a diagram showing one example of a flow of display on an operation panel according to the embodiment in a case where there is no unprocessed job.
Figure 7:
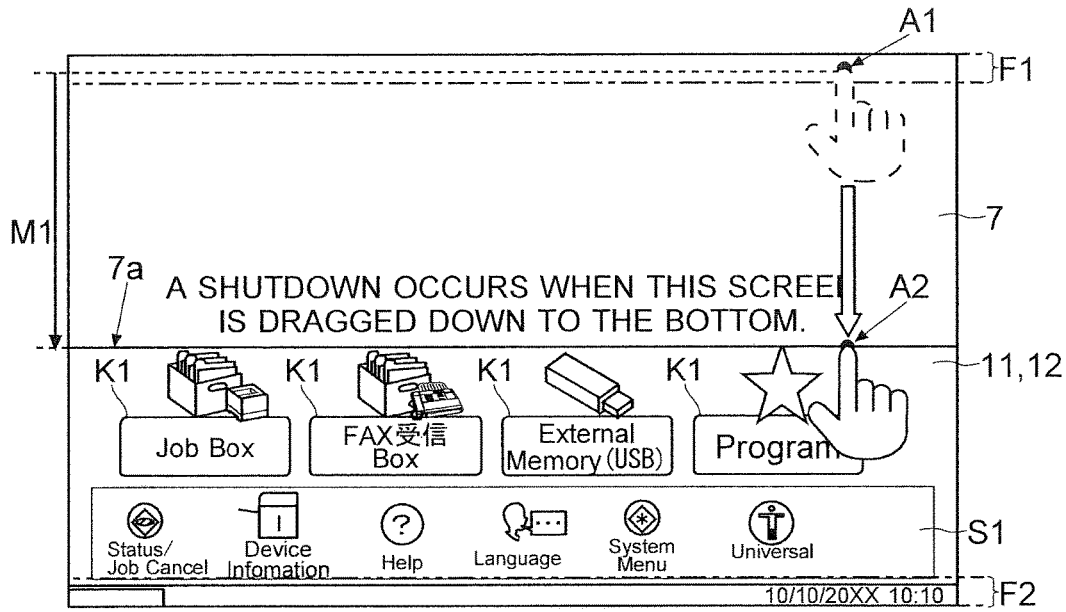
FIG. 7 is a diagram showing the one example of the flow of display on the operation panel according to the embodiment in the case where there is no unprocessed job.
Figure 8:
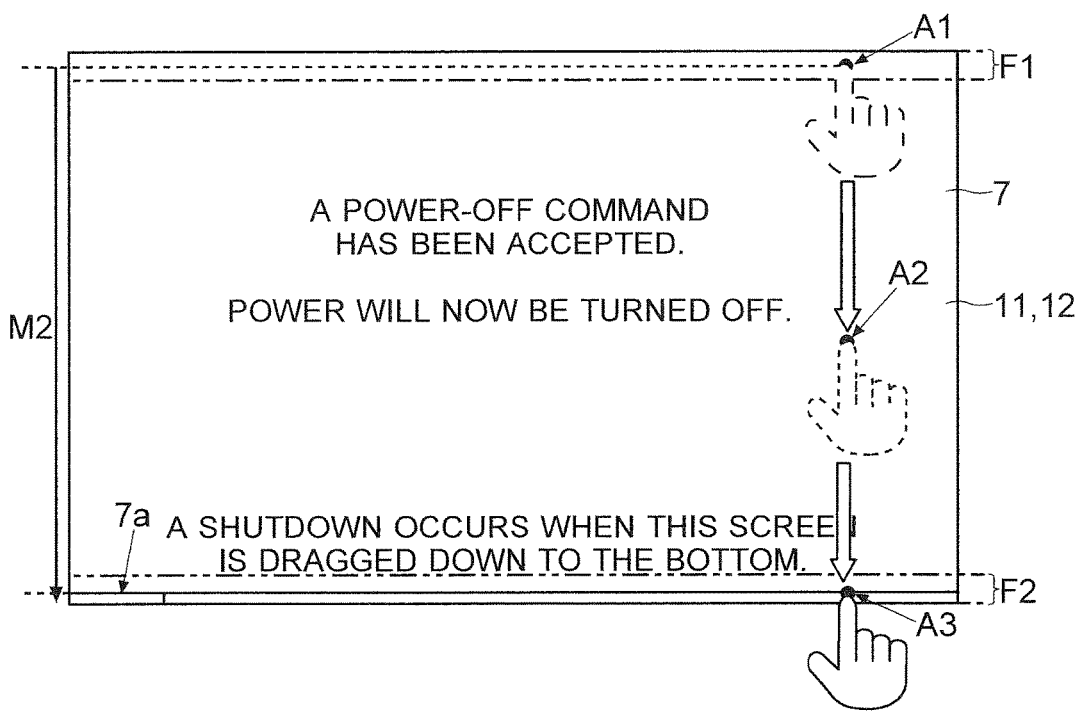
FIG. 8 is a diagram showing the one example of the flow of display on the operation panel according to the embodiment in the case where there is no unprocessed job.

Next, with reference to FIG. 6 to FIG. 8, a description is given of a flow of display in a case where there is no unprocessed job. FIG. 6 to FIG. 8 are diagrams showing one example of a flow of display on the operation panel 1 according to the embodiment in a case where there is no unprocessed job.

The control portion 4 recognizes, as a drag operation, an operation in which a touch on the start region F1 is recognized, and while the touch is maintained, a touch position is moved in a sliding manner in a direction of the end region F2. Upon recognizing the drag operation, the control portion 4 controls the display panel 11 to display a drag screen 7. The drag screen 7 is a screen displayed on an upper side (in an uppermost tier) of a screen being displayed. In each of FIG. 6 to FIG. 8, the screen being displayed (a screen in a lower tier with respect to the drag screen 7) is the main menu screen S1 (see FIG. 3).

The control portion 4 controls the display panel 11 to display the drag screen 7 in such a manner that, as the drag operation is continued and thus a movement amount of the touch position from the start region F1 in the end region direction increases, an area of the drag screen 7 increases. At this time, the control portion 4 controls the display panel 11 to display the drag screen 7 in such a manner that the drag screen 7 is dragged out in a sliding manner from the start region F1 (the end side of the display region, which is in contact with an outer side of the start region F1) so as to follow a slide movement direction of the touch position. In other words, the control portion 4 controls the display panel 11 to perform animation display in which, as the touch position slides, the drag screen 7 is dragged out like a curtain.

When, in a state where there is no unprocessed job (a job being executed or a job that has been inputted to the multi-functional peripheral 100 and is still waiting to be executed), a drag operation is continued, so that a touch position has arrived at the end region F2, the control portion 4 recognizes that a power-off command has been issued. Then, the control portion 4 starts shutdown processing (which will be detailed later). In a state where there is/are an unprocessed job(s), even when a touch position has arrived at the end region F2, the control portion 4 does not recognize that a power-off command has been issued and thus does not perform shutdown processing (which will be detailed later).

Specifically, with reference to FIG. 6 to FIG. 8, a description is given of a flow of display of the drag screen 7 in the multi-functional peripheral 100 in a case where there is no unprocessed job.

The following describes a case where the start region F1 is provided along the upper end side of the display region, and the end region F2 is provided along the lower end side of the display region (Combination A). Further, an example is described in which in accordance with a movement amount of a touch position in a direction from up to down, the drag screen 7 is dragged out in a direction from up (from the upper end side of the display panel 11) to down. Since the drag screen 7 is dragged out in the direction from up to down, an operation for performing power-off of the multi-functional peripheral 100 is performed as if a curtain is drawn down. The gesture operation for performing power-off, therefore, is intuitive and easy to perform. Combinations B to D are different from Combination A only in positional relationship between the start region F1 and the end region F2 and in direction in which the drag screen 7 is dragged out (a direction indicated by a solid arrow in FIG. 5), and thus the following description is similarly appreciable also to Combinations B to D.

Furthermore, with reference to FIG. 6 to FIG. 8, a description is given of a case where a drag operation is performed on the main menu screen S1. Also on each of the various screens displayed on the display panel 11, the drag screen 7 is displayed by performing a drag operation so that power-off can be performed. A drag operation on any other screen than the main menu screen S1 and the execution status screen S2 is performed in a similar manner, and depictions and description thereof, therefore, are omitted.

FIG. 6 shows a start point in time of a touch on the start region F1 (a state where a touch is made on a point A1). FIG. 7 shows a state in the middle of moving a touch position from the point A1 toward the end region F2 (a state where a touch is made on a point A2). FIG. 8 shows one example of a state where the touch position has arrived at the end region F2 (a state where the touch position has been moved to a point A3). A movement amount in an up-down direction in the state shown in FIG. 7 is indicated as M1, and such a movement amount in the state shown in FIG. 8 is indicated as M2.

A movement amount (a slide amount) of the touch position from the start region F1 to the end region direction is shown to increase in the order of FIG. 6, FIG. 7, and FIG. 8. Even when the touch position is inclined obliquely with respect to the up-down direction, the control portion 4 focuses attention only on an up-down direction component among components of oblique movement. As shown in FIG. 6 to FIG. 8, the control portion 4 controls the display panel 11 to display the drag screen 7 in such a manner that, as a movement amount of the touch position from the start region F1 toward the end region direction increases, the drag screen 7 is dragged out from the start region F1 toward the end region direction.

In this embodiment, the control portion 4 performs control so that a touch position (coordinates) detected by the touch panel portion 12 is aligned with a position of a side 7a of the drag screen 7 on an end region side. The control portion 4 performs control so that the position of the side 7a of the drag screen 7 on the end region side is moved in conjunction with movement of the touch position (as if the side 7a has stuck to a fingertip). There may be a deviation between the touch position and the position of the side 7a of the drag screen 7 on the end region side. In this case, the drag screen 7 is slid (scrolled) so that a difference (a deviation) between the touch position and the position of the side 7a of the drag screen 7 on the end region side falls within a predetermined tolerance range. The tolerance range (absolute values) can be set to about several millimeters to several centimeters.

At a point in time when a drag operation is continued (without a finger being released from the touch panel portion 12 after a touch is made on the start region F1) and a touch position has arrived at the end region F2, the control portion 4 recognizes that a power-off command has been issued.

(Shutdown Processing)

Figure 9:
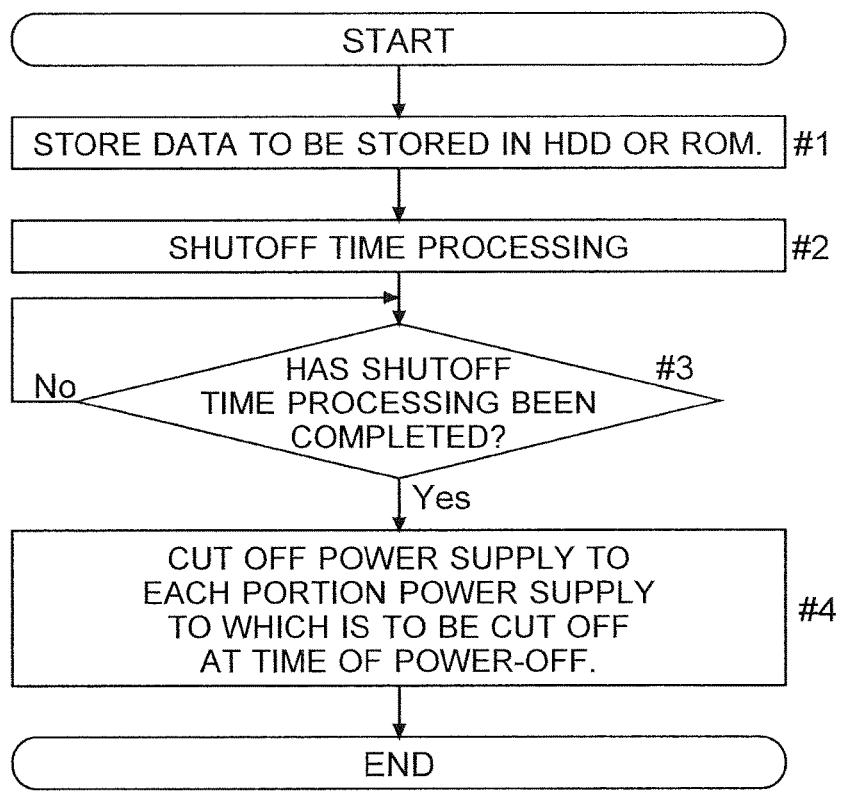
FIG. 9 is a flow chart showing one example of a flow of shutdown processing performed in a multi-functional peripheral according to the embodiment.

Next, with reference to FIG. 9, a description is given of one example of a flow of shutdown processing performed in the multi-functional peripheral 100 according to the embodiment. FIG. 9 is a flow chart showing the one example of a flow of shutdown processing performed in the multi-functional peripheral 100 according to the embodiment.

"START" in FIG. 9 refers to a point in time when, in a state where there is no unprocessed job, based on a drag operation, the control portion 4 recognizes that a power-off command has been issued.

First, the control portion 4 performs control so that, among data stored in a cache memory in the CPU 4a or the RAM 51, a type of data predetermined to be stored (specific data) is stored in the HDD 53 or the ROM 52 (Step #1). That is, as one step of the shutdown processing, processing of storing the specific data is performed. A type of data to be stored as the specific data can be determined as appropriate. For example, from the viewpoint of managing life of the multi-functional peripheral 100 or members in the multi-functional peripheral 100, an item value (a value used to obtain a cumulative total) such as a time of use from power-on to a current point in time (a power-off point in time), the number of paper sheets printed, or the number of original documents scanned may be used as the specific data. Furthermore, information indicating a state of the multi-functional peripheral 100 at a power-off point in time, such as a remaining quantity of toner, may also be used as the specific data.

Subsequently, the control portion 4 performs shutoff time processing that is processing for protecting the storage portion 5 and is to block access to the storage devices (Step #2). That is, as one step of the shutdown processing, the shutoff time processing is performed.

When power supply to the HDD 53 is cut off while the HDD 53 is in operation (while data is being written or read), the data or a magnetic disc in the HDD 53 might be damaged. In order to avoid this, in a case where the HDD 53 is incorporated, the control portion 4 controls the HDD 53 to stop data writing and reading and to retract a magnetic head as the shutoff time processing.

Furthermore, when power supply to a flash memory is cut off while the flash memory is in operation (while data is being written or read), the data might be damaged. Further, there is a case where, in the multi-functional peripheral 100, a flash memory is used as the ROM 52 that stores various types of programs and data. Furthermore, there is also a case where an SSD is incorporated in place of the HDD 53. The control portion 4, therefore, controls a storage device incorporating a flash memory therein to stop data writing and reading as the shutoff time processing.

Then, the control portion 4 continuously confirms whether or not the shutoff time processing has been completed in all the non-volatile storage devices (Step #3, No at Step #3 Step #3). Upon completion of the shutoff time processing in all the non-volatile storage devices, the control portion 4 controls a power source device 6 to cut off power supply to each portion power supply to which is determined to be cut off at a time of power-off (Step #4). This completes the shutdown processing, and thus power to the multi-functional peripheral 100 is shut down (END).

In the multi-functional peripheral 100, the power source device 6 (see FIG. 2) is provided. The power source device 6 receives power from a commercial power source. The power source device 6 includes a rectification circuit and a voltage conversion circuit and generates a plurality of types of voltages necessary for operations of the portions included in the multi-functional peripheral 100. Further, the power source device 6 supplies power (applies the voltages thus generated) to the various portions of the multi-functional peripheral 100, such as the display input device (the operation panel and the control portion 4).

Upon receiving a power-off command from the control portion 4, the power source device 6 cuts off power supply to the each portion power supply to which is determined to be cut off at a time of power-off. Here, in the multi-functional peripheral 100 of this embodiment, power-off can be performed by a gesture operation (simply by performing an operation with respect to the touch panel portion 12). Thus, it is possible to eliminate the need to provide a switch (a hard key) dedicated to performing power-on/off. In this case, instead of providing the switch for performing power on/off thus omitted, the power source device 6 is set to perform voltage application to a portion for issuing a power-on command to turn on power to the multi-functional peripheral 100 also in a power-off state.

The portion for issuing a power-on command can be determined as appropriate. A configuration may be adopted in which a voltage is applied beforehand to the touch panel portion 12, and based on electrical conduction (a signal variation, a variation in output voltage) caused by a touch on the touch panel portion 12, it is detected that a power-on command has been inputted by a user. Alternatively, a configuration may also be adopted in which a specific hard key such as the start key or a specific numeric key in the numeric keypad on the operation panel 1 is predetermined to be used as a switch for performing power-on. A configuration may also be adopted in which, based on a signal variation (a variation in output voltage) attributable to an operation with respect to a specific one of the hard keys 13, it is detected that a power-on command has been inputted by a user.

An output signal from the portion for issuing a power-on command is inputted to the power source device 6. When there has occurred a variation in output signal of the portion for issuing a power-on command, the power source device 6 starts power supply to the each portion power supply to which is to be cut off at a time of power-off. Furthermore, an output signal from the portion for issuing a power-on command may be inputted to the control portion 4. In this case, power is supplied beforehand only to a portion of the control portion 4, which detects a power-on command. When there has occurred a variation in output signal of the portion for issuing power-on command, a part of the control portion 4 recognizes a power-on command. The control portion 4 issues a command that power supply to the each portion power supply to which is to be cut off at a time of power off should be started. This brings the multi-functional peripheral 100 and the operation panel 1 to a power-on state. (Display in Case where there is/are Unprocessed Job(s))

Figure 10:
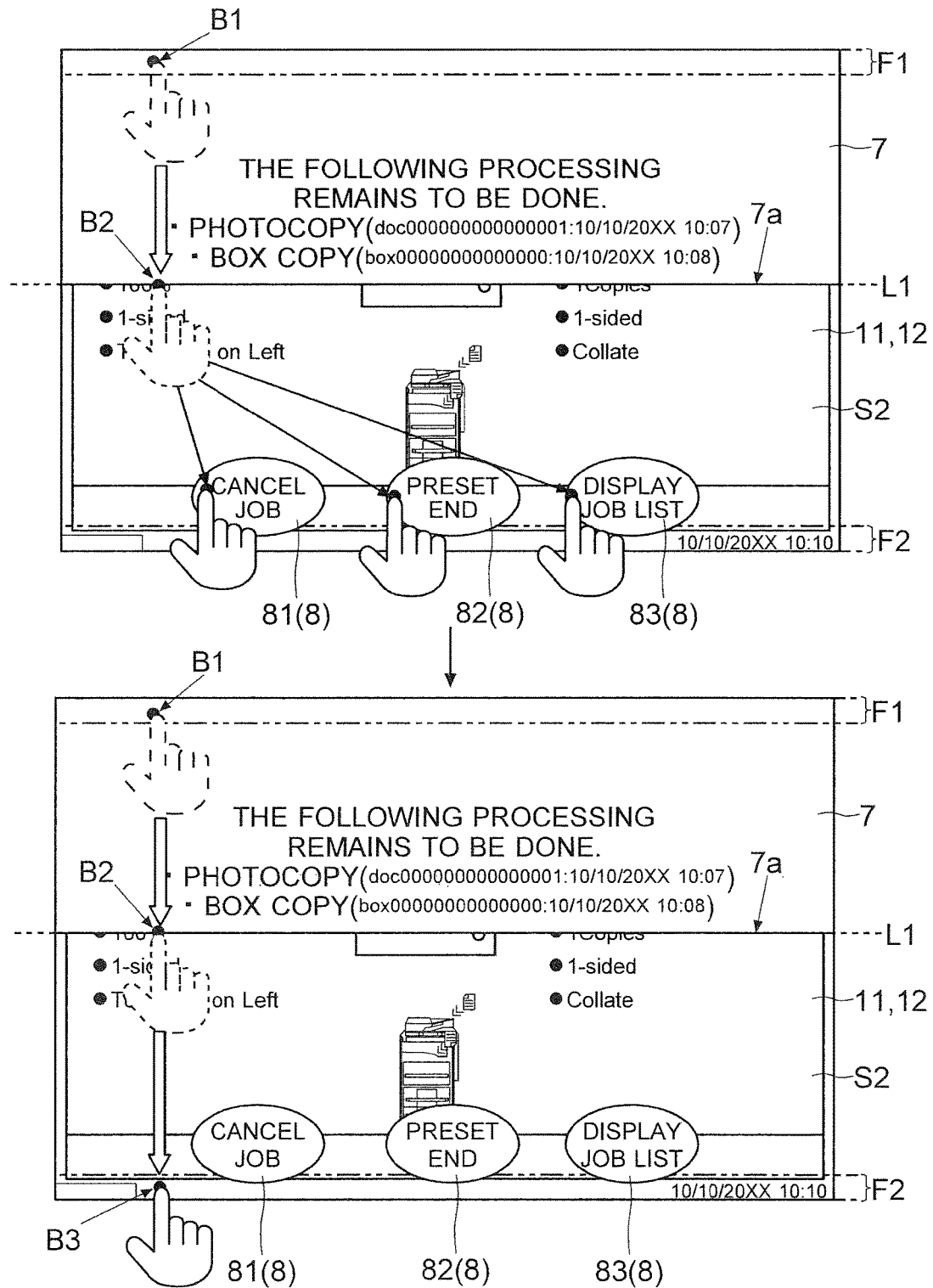
FIG. 10 is a diagram showing one example of a flow of display on the operation panel according to the embodiment in a case where there is/are an unprocessed job(s).

Next, with reference to FIG. 10 and FIG. 11, a description is given of a flow of display on the operation panel 1 according to the embodiment in a case where there is/are an unprocessed job(s). FIG. 10 is a diagram showing one example of a flow of display on the operation panel 1 according to the embodiment in a case where there is/are an unprocessed job(s). FIG. 11 is a diagram showing one example of a job detailed list screen S3 displayed on the display panel 11 according to the embodiment.

Even in a case where there is/are an unprocessed job(s), the control portion 4 recognizes, as a drag operation, an operation in which a touch on the start region F1 is recognized, and while the touch is maintained, a touch position is moved in a sliding manner to the end region direction. Upon recognizing the drag operation, the control portion 4 controls the display panel 11 to display the drag screen 7. Furthermore, the control portion 4 controls the display panel 11 to display the drag screen 7 in such a manner that, as the drag operation is continued and thus a movement amount (a slide amount) of the touch position from the start region F1 toward the end region F2 increases, an area of the drag screen 7 increases. Furthermore, a difference between the touch position and a position of the side 7*a* of the drag screen 7 on the end region side is set to fall within a predetermined tolerance range (these positions are aligned with each other on the operation panel 1 of this embodiment). A similar description to that of the case where there is no unprocessed job applies also in these respects.

However, in a state where the storage portion 5 stores data of a job being executed and a job(s) waiting to be executed (a state where there is/are an unprocessed job(s)), the control portion 4 controls the display panel 11 to perform display in which, as a touch position is moved in a sliding manner to the end region side, the drag screen 7 is dragged out until a limitation line L1 and the side 7*a* of the drag screen 7 on the end region side are lined up with each other.

After the limitation line L1 and the side 7*a* of the drag screen 7 on the end region side have been lined up with each other, even when the touch position is moved to the end region side, the control portion 4 keeps the side 7*a* of the drag screen 7 on the end region side from approaching the end region F2 (keeps an area of the drag screen 7 unchanged). Further, the control portion 4 controls the display panel 11 to display a screen in which the side 7*a* of the drag screen 7 on the end region side and the limitation line L1 are kept positionally lined up with each other. Furthermore, in a state where there is/are an unprocessed job(s), even when a touch position has arrived at the end region F2, the control portion 4 does not recognize that a power-off command has been issued.

A position of the limitation line L1 on the display panel 11 can be determined as appropriate. On the display panel 11, a position separated from a side of the start region F1 in the end region direction by about ½ of a short side or a long side of the display region can be used as a position of the limitation line L1.

Specifically, with reference to FIG. 10, a description is given of display of the drag screen 7 in a state where there is/are an unprocessed job(s). FIG. 10 illustrates a case where a drag operation is performed on the job execution status screen S2 (see FIG. 4). In each of upper and lower drawings in FIG. 10, a point B1 is depicted as a first touch point in the start region F1.

Until the limitation line L1 and the side 7*a* of the drag screen 7 on the end region side are lined up with each other, the control portion 4 controls the display panel 11 to display the drag screen 7 in such a manner that, as a movement amount (a slide amount) of a touch position from the start region F1 toward the end region direction increases, the drag screen 7 is dragged out from the start region F1 toward the end region direction.

As shown in the lower drawing in FIG. 10, after the limitation line L1 and the side 7*a* of the drag screen 7 on the end region side have been lined up with each other (after a touch position has arrived at the point B2), the control portion 4 performs control so that even when the touch position is moved further to the end region direction, an area of the drag screen 7 is not increased, with the limitation line L1 and the side 7*a* of the drag screen 7 on the end region side maintained in a state of being aligned with each other. In a state where there is/are an unprocessed job(s), as shown in the lower drawing in FIG. 10, even when a touch position has arrived at the point B3 in the end region F2, the control portion 4 does not recognize that a power-off command has been issued.

Furthermore, as shown in each of the upper and lower drawings in FIG. 10, when a drag operation has been performed in a state where there is/are an unprocessed job(s), the control portion 4 performs control so that a message such as "The following processing remains to be done." and information on an unprocessed job(s) are displayed in the drag screen 7. FIG. 10 shows an example in which a type of each unprocessed job (copying and box printing) is displayed. Furthermore, a job title and information such as a date and time when a job was inputted to the multi-functional peripheral 100 may also be displayed. This makes it possible to recognize what type of job is being executed or waiting to be executed.

When power is turned off while a printing job is being executed, a paper sheet remains in a conveyance path. When power is turned off while a transmission job is being executed, communication is forcibly interrupted, so that previously ongoing communication is wasted. Furthermore, a user who has inputted a job being executed or a job waiting to be executed can no longer obtain a result of the job. It is, therefore, not preferable to forcibly turn off power while there is/are an unprocessed job(s).

Thus, in order for a user to be able to make a selection from among prepared options, when a drag operation has been performed in a state where there is/are an unprocessed job(s), the control portion 4 controls the display panel 11 to display a plurality of option keys 8. As shown in the upper and lower drawings in FIG. 10, the display panel 11 displays the various option keys 8 outside the drag screen 7. Specifically, in a state where there is/are an unprocessed job(s), the drag screen 7 is dragged out only up to the limitation line L1, and thus the control portion 4 performs control so that the option keys 8 are displayed in a screen on a side closer to the end region side with respect to the limitation line L1.

Options to be prepared when a drag operation has been performed in a state where there is/are an unprocessed job(s) can be determined as appropriate. On the operation panel 1 of this embodiment, as the option keys 8, a job cancellation key 81, an end preset key 82, and a list display key 83 are displayed.

The control portion 4 recognizes an operation of moving a touch position touched in a drag operation to any one of the option keys 8 as an operation of selecting the any one of the option keys 8. As shown in the upper drawing in FIG. 10, while maintaining a touch, a user moves a touch position in a sliding manner to a position of a desired one of the option keys 8. The control portion 4 performs processing corresponding to the thus operated one of the option keys 8.

The job cancellation key 81 is a key for issuing a command to cancel execution of one of unprocessed jobs that has not yet been started. Once it has been confirmed with a person who has inputted a job that he/she agrees to cancellation of the job, turning off power would pose no problem. When the job cancellation key 81 has been selected, the control portion 4 does not execute an unprocessed job. Data of such an unprocessed job may be stored in a non-volatile manner in the storage portion 5. Then, next time power-on is performed, the control portion 4 may control the printing portion 3, the image reading portion 2*b*, and the communication portion 41 to perform the job stored in the storage portion 5.

Furthermore, when a printing job is being executed at a point in time when the job cancellation key 81 is operated, the control portion 4 may cancel the printing job before its completion. When cancelling a printing job before its completion, in order to prevent a paper sheet from remaining in the conveyance path, the control portion 4 performs control so that the paper feed portion 3*a* withholds feeding of a succeeding paper sheet, and paper sheets that have been fed are all discharged onto the discharge tray, after which the printing portion 3 is completely stopped from operating. As for a transmission job being executed, the control portion 4 may control the communication portion 41 to continue the transmission job till the end or to end the transmission job before its completion.

Furthermore, the end preset key 82 is a key for issuing a command to preset power-off so that processing for power-off is started upon completion of all jobs. When the end preset key 82 has been selected, upon completion of all uncompleted jobs, the control portion 4 starts shutdown processing (see FIG. 9).

Furthermore, the list display key 83 is a key for issuing a command to display a detailed list of unprocessed jobs. When the list display key 83 has been selected, the control portion 4 controls the display panel 11 to display the detailed list screen S3 on which unprocessed jobs are displayed in list form (see FIG. 11).

The control portion 4 controls the display panel 11 to display the detailed list screen S3 including information related to a job currently being executed and a job(s) waiting to be executed, which is stored in the storage portion 5. As the information related to such jobs, a job type, a state of each job, and a job name are displayed. Other than these, information such as a date and time when each job was inputted in the multi-functional peripheral 100 may also be displayed.

On the detailed list screen S3, a field of one of the listed jobs that is desired to be cancelled is touched, and a cancellation key K2 is operated, so that execution of that specific one of the unprocessed jobs can be cancelled. Upon a touch on any one of the fields in the detailed list screen S3, the control portion 4 recognizes a job corresponding to the any one of the fields thus touched as a selected job. Moreover, when the cancellation key K2 has been operated in a state where a job is selected, without executing the selected job, the control portion 4 controls the storage portion 5 to erase data corresponding to the selected job. Thus, in a case where it is desired to turn off power as soon as possible, execution of a specific job can be cancelled.

(Rewinding of Drag Screen 7 and Cancellation of Power-Off)

Figure 12:
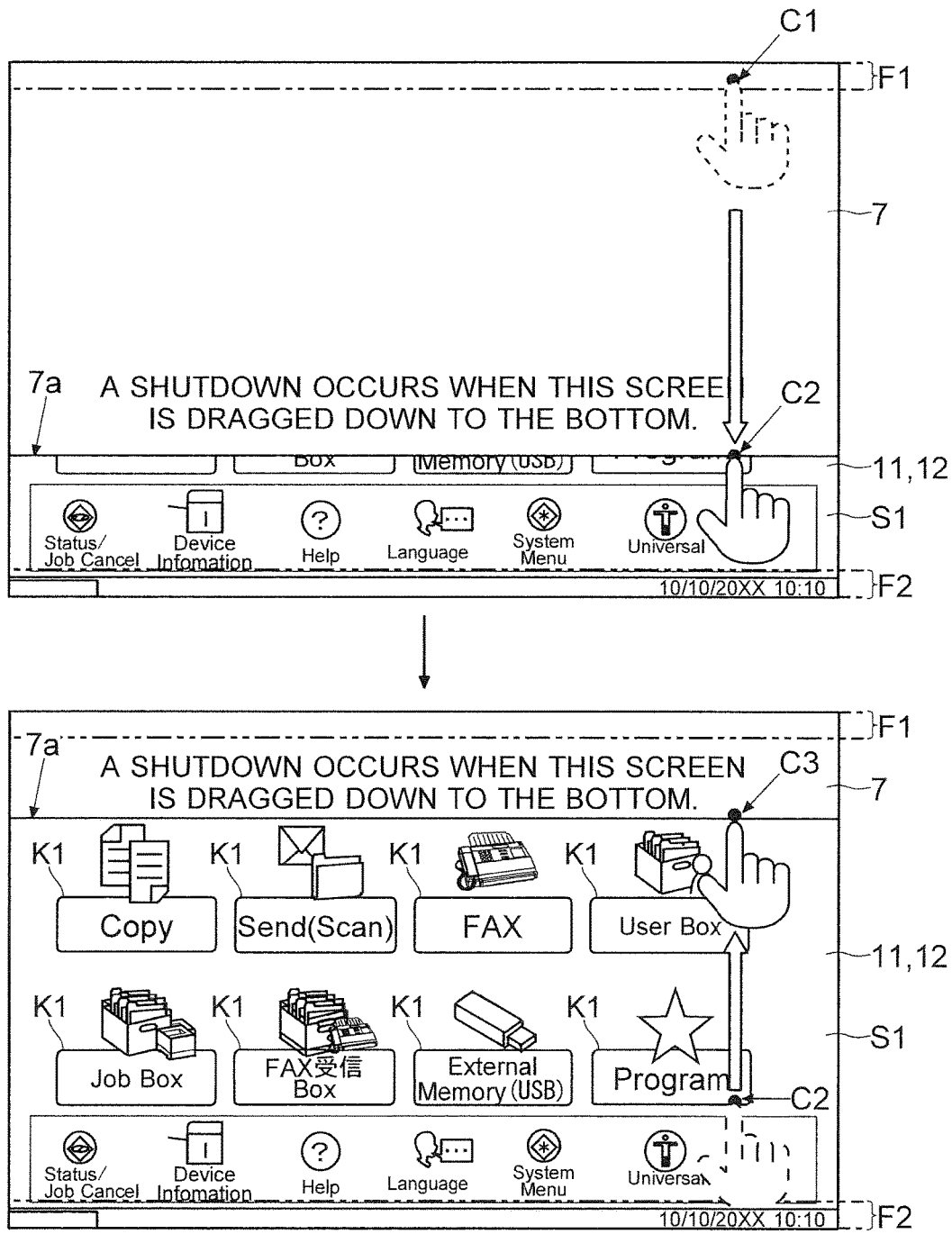
FIG. 12 is a diagram showing one example of how a drag screen is rewound according to the embodiment.

Next, with reference to FIG. 12, a description is given of rewinding of the drag screen 7 and cancellation of power-off according to the embodiment. FIG. 12 is a diagram showing one example of rewinding of the drag screen 7 according to the embodiment.

By moving a touch position from the start region F1 to the end region F2, power to the multi-functional peripheral 100 and the operation panel 1 can be turned off. There is, however, a case where it is desired to cancel power-off, such as when, on second thought, it is considered better not to turn off power before completion of a job or when a drag operation has been erroneously performed.

The touch panel portion 12 accepts a cancellation operation of cancelling an operation for performing power-off. Based on an output of the touch panel portion 12, the control portion 4 recognizes the cancellation operation of cancelling an operation for performing power-off, which has been performed with respect to the touch panel portion 12.

On the operation panel 1, after a start of a drag operation, an operation in which a finger is released from the touch panel portion 12 before arriving at the end region F2 or an operation in which a touch position is returned to the start region F1 is accepted as the cancellation operation. In a case of cancelling power-off after making a touch on the start region F1, a user is only required to release his/her finger from the touch panel portion 12 or return a touch position to the start region F1. Based on an output of the touch panel portion 12, the control portion 4 recognizes that the cancellation operation has been performed. In either of a state where there is/are an unprocessed job(s) and a state where there is no such a job, the control portion 4 recognizes the cancellation operation. Upon recognizing that the cancellation operation has been performed, the control portion 4 controls the display panel 11 to stop displaying the drag screen 7. As a result, an original screen in its entirety is displayed (a return is made to a state before the start of the drag operation).

Further, when the operation of returning a touch position to the start region F1 has been performed in order to cancel power-off, the control portion 4 performs control so that, as the touch position approaches the start region F1, an area of the drag screen 7 decreases as if the drag screen 7 is rewound. In other words, in accordance with the operation of returning the touch position to a start region F1 direction, the drag screen 7 is returned while being slid so as to be retracted.

In FIG. 12, an upper drawing shows a state where, after a touch is made on a point C1 in the start region F1, a touch position is slid from up to down to a position (a point C2) at about ¼ of a length of the display panel 11 in a vertical direction thereof from a lower end edge of the display panel 11.

On the other hand, in FIG. 12, a lower drawing shows a state where a touch position is returned (slid) from the point C2 to a position (a point C3) about ⅕ of the length of the display panel 11 in the vertical direction thereof below from an upper end edge of the display panel 11. As shown in the lower drawing in FIG. 11, as the touch position moves upward, an area of the drag screen 7 decreases. The side 7a of the drag screen 7 on the end region side is made to follow the upward movement of the touch position so as to be aligned with the touch position being slid (so that a deviation between the touch position and the side 7a of the drag screen 7 on the end region side falls within the tolerance range).

As described above, the display input device (the operation panel 1) according to the embodiment includes the display panel 11 that displays a setting screen and keys, the touch panel portion 12 that is provided with respect to the display panel 11, and the control portion 4 that, based on an output of the touch panel portion 12, recognizes a content of an operation performed by a user, recognizes a drag operation in which a touch is made on the predetermined start region F1 in the display region of the display panel 11, and while the touch is maintained, a touch position is moved in a sliding manner toward the predetermined end region F2 that is distant from the start region F1, recognizes, as a power-off command to turn off power, an arrival of the touch position at the end region F2 as a result of continuing the drag operation, and upon recognizing the power off command, performs control so that processing for power-off is performed.

By this configuration, a user can perform power-off simply by performing the gesture operation (the drag operation) with respect to the touch panel. Furthermore, there is no need to provide, as one of the hard keys 13, a hard key for performing power-off, and thus advantages are provided in terms of a manufacturing cost and designing of the image formation device (the multi-functional peripheral 100). Furthermore, this configuration saves the trouble of looking for a location of the one of the hard keys 13 when performing power-off. Furthermore, there is also no need to always display a soft key for performing power-off in a screen of the display panel 11, and thus the entire display region of the display panel 11 can be used effectively.

It has been conventionally the case that, upon a switch for performing power-off (one of the hard keys 13 or a soft key) being operated, processing for power-off is immediately started. This has been inconvenient in that an erroneous operation of the switch for performing power-off ends up requiring that the display input device (the operation panel 1) and the image formation device (the multi-functional peripheral 100) be rebooted. As a solution to this, the start region F1 is provided so as to be in contact with any one of end sides of the display region of the display panel 11. Furthermore, the end region F2 is provided so as to be in contact with one of the end sides of the display region of the display panel 11, which is opposed to the any one of end sides of the display region. When a drag operation has been performed after a touch had been made on the start region F1, the control portion 4 controls the display panel 11 to display the drag screen 7 as superimposed on a screen being displayed. The drag screen 7 is displayed in such a manner as to be dragged out in a sliding manner from the end side on a start region F1 side toward the end region direction, so that as a movement amount of a touch position from a start of the touch on the start region F1 toward the end region direction increases, the display panel 11 gradually increases a display area of the drag screen 7.

By this configuration, power-off is prevented from being started by erroneous starting of a drag operation alone. Accordingly, an erroneous operation would not immediately lead to power-off of the device, and thus a user-friendly display input device (the operation panel 1) can be provided. Furthermore, after a start of a drag operation, a user can visually recognize how much more distance a touch position should be moved until power-off is accepted. Thus, an input to issue a power-off command can be made instinctively and sensuously.

When power-off is performed while a job is being executed, the job is undesirably ended before its completion, causing a paper sheet jam in the image formation device (the multi-functional peripheral 100). Furthermore, when power-off is performed while there is/are a job(s) waiting to be executed (on standby), the job(s) waiting to be executed would remain unexecuted. Power-off should not be performed against a user's desire to execute a job.

For this reason, when a drag operation has been performed in a state where there is/are an unprocessed job(s), the control portion 4 performs control so that the unprocessed job(s) is/are displayed in the drag screen 7. By this configuration, it can be confirmed whether or not there is/are a job(s) at a point in time when power-off is about to be performed. Thus, a user can easily recognize a reason why power-off should not be performed.

Furthermore, in a case where a drag operation has been performed in a state where there is no unprocessed job, while a difference between a touch position and a position of the side 7a of the drag screen 7 on the end region side is set to fall within the predetermined tolerance range, the control portion 4 controls the display panel 11 to display the drag screen 7 in such a manner that, as a movement amount of the touch position to the end region direction increases, a display area of the drag screen 7 gradually increases. Further, in a case where a drag operation has been performed in a state where there is/are an unprocessed job(s), until the side 7a of the drag screen 7 on the end region side arrives at the predetermined limitation line L1, while a difference between a touch position and a position of the side 7a of the drag screen 7 on the end region side is set to fall within the predetermined tolerance range, the control portion 4 controls the display panel 11 to display the drag screen 7 in such a manner that, as a movement amount of the touch position to the end region direction in the drag operation increases, a display area of the drag screen 7 gradually increases. In this case, after the side 7a of the drag screen 7 on the end region side has arrived at the limitation line L1, even when the touch position is moved further to the end region direction, the control portion 4 controls the display panel 11 to continue displaying the drag screen 7 dragged out up to the limitation line L1, and even when the touch position has arrived at the end region F2, the control portion 4 does not recognize that a power-off command has been issued.

By this configuration, in a case where at a point in time when power-off is about to be performed, there is/are an unprocessed job(s), automatic power-off can be prohibited from happening. Furthermore, compared with a case where there is no unprocessed job, the drag screen 7 can be dragged out only up to halfway, which allows a user to sensuously recognize that power-off is disabled.

Furthermore, when a drag operation has been performed in a state where there is/are an unprocessed job(s), the control portion 4 controls the display panel 11 to display, as one of the option keys 8, at least one of the job cancellation key 81 for issuing a command to cancel execution of one of unprocessed jobs that has not yet been started, the end preset key 82 for issuing a command to preset power-off so that processing for power-off is started upon completion of all unprocessed jobs, and the list display key 83 for issuing a command to display a detailed list of unprocessed jobs, and performs processing corresponding to the one of the option keys 8 thus selected.

By this configuration, measures for coping with a fact that power-off is disabled due to an unprocessed job(s) are displayed as options so that a user can select a desired one from among them. Furthermore, via the job cancellation key 81, execution of a job is cancelled so that a power-off enabled state can be immediately established. Furthermore, via the end preset key 82, it is possible to preset power to be turned off upon completion of all jobs. Accordingly, it is no longer required that an operation for performing power-off be performed again so as to be timed with completion of all jobs. Furthermore, via the list display key 83, it is also possible to confirm a detail of each currently unprocessed job.

Furthermore, the display panel 11 displays the option keys 8 outside the drag screen 7. The control portion 4 recognizes an operation of moving a touch position touched in a drag operation to any one of the option keys 8 as an operation of selecting the any one of the option keys 8. By this configuration, by an extremely simple operation subsequent to a drag operation, a selection can be made from among the option keys 8 displayed when power-off is disabled because there is/are an uncompleted job(s).

Furthermore, after a drag operation, the control portion 4 performs control so that the drag screen 7 is displayed in such a manner as to be retracted in a sliding manner to the end side on the start region F1 side, so that as a return amount of a touch position moved to be returned to the start region F1 direction increases, the display panel 11 gradually decreases a display area of the drag screen 7. Further, when the touch position has been returned to the start region F1 or when a touch has been released before arriving at the end region F2, the control portion 4 controls the display panel 11 to stop displaying the drag screen 7.

By this configuration, an operation for performing power-off can be cancelled before its completion. Furthermore, the drag screen 7 is brought back, while sliding, to an original state at a start of a drag operation and thus is switched back to a normal screen, which allows a user to visually recognize that an operation for performing power-off has been cancelled.

Furthermore, the image formation device (the multi-functional peripheral 100) includes the storage portion 5 (the RAM 51, ROM 52, and HDD 53) that stores data, the power source device 6 that supplies power to the display input device (the operation panel 1) and the storage portion 5, and the above-described display input device. Further, upon recognizing a power-off command, the control portion 4 controls the storage portion 5 to perform shutdown processing that is processing for protecting stored data, and after completion of the shutdown processing such as shutoff time processing, the power source device 6 cuts off power supply to the each portion power supply to which is to be cut off at a time of power-off.

By this configuration, there can be provided the image formation device (the multi-functional peripheral 100) that eliminates the need to provide a hard key for performing power-off as one of the hard keys 13 and saves the trouble of looking for a location of the one of the hard keys 13 when performing power-off. Furthermore, there can be provided the image formation device that allows power to be turned off safely and easily.

While the foregoing has described the embodiment of the present invention, the scope of the present invention is not limited thereto, and the present invention can be implemented by adding various modifications thereto without departing from the spirit of the invention.

INDUSTRIAL APPLICABILITY

The present invention is usable in a display input device and an image formation device including the display input device.

The invention claimed is:

1. A display input device, comprising:
a display panel that displays a setting screen and keys;
a touch panel portion that is provided with respect to the display panel; and
a control portion that, based on an output of the touch panel portion, recognizes a content of an operation performed by a user, recognizes a drag operation in which a touch is made on a predetermined start region in a display region of the display panel, and while the touch is maintained, a touch position is moved in a sliding manner toward a predetermined end region that is distant from the start region, recognizes, as a power-off command to turn off power, an arrival of the touch position at the end region as a result of continuing the drag operation, and upon recognizing the power-off command, performs control so that processing for power-off is performed;
wherein
the start region is provided so as to be in contact with any one of end sides of the display region of the display panel,
the end region is provided so as to be in contact with one of the end sides of the display region of the display panel, which is opposed to the any one of end sides of the display region, and
when the drag operation has been performed after a touch had been made on the start region, the control portion controls the display panel to display a drag screen as superimposed on a screen being displayed, the drag screen being displayed in such a manner as to be dragged out in a sliding manner from the end side on a start region side toward an end region direction, so that as a movement amount of a touch position from a start of the touch on the start region toward the end region direction increases, the display panel gradually increases a display area of the drag screen.

2. The display input device according to claim 1, wherein when the drag operation has been performed in a state where there is an unprocessed job, the control portion performs control so that information on the unprocessed job is displayed in the drag screen.

3. The display input device according to claim 1, wherein in a case where the drag operation has been performed in a state where there is no unprocessed job, while a difference between a touch position and a position of a side of the drag screen on an end region side is set to fall within a predetermined tolerance range, the control portion controls the display panel to display the drag screen in such a manner that, as a movement amount of the touch position to the end region direction increases, a display area of the drag screen gradually increases, and in a case where the drag operation has been performed in a state where there is an unprocessed job, until the side of the drag screen on the end region side arrives at a predetermined limitation line, while a difference between a touch position and a position of the side of the drag screen on the end region side is set to fall within the predetermined tolerance range, the control portion controls the display panel to display the drag screen in such a manner that, as a movement amount of the touch position to the end region direction in the drag operation increases, a display area of the drag screen gradually increases, in which case, after the side of the drag screen on the end region side has arrived at the limitation line, even when the touch position is moved further to the end region direction, the control portion controls the display panel to continue displaying the drag screen dragged out up to the limitation line, and even when the touch position has arrived at the end region, the control portion does not recognize that the power-off command has been issued.

4. The display input device according to claim 1, wherein when the drag operation has been performed in a state where there is an unprocessed job, the control portion controls the display panel to display, as one of option keys, at least one of a job cancellation key for issuing a command to cancel execution of one of unprocessed jobs that has not yet been started, an end preset key for issuing a command to preset power-off so that processing for power-off is started upon completion of all the unprocessed jobs, and a list display key for issuing a command to display a detailed list of the unprocessed jobs, and performs processing corresponding to the one of option keys thus selected.

5. The display input device according to claim 4, wherein the display panel displays the option keys outside the drag screen, and the control portion recognizes an operation of moving a touch position touched in the drag operation to any one of the option keys as an operation of selecting the any one of the option keys.

6. The display input device according to claim 4, wherein when the list display key has been operated, the control portion controls the display panel to display a detailed list screen on which unprocessed jobs are shown in list form and a cancellation key is provided, and upon a touch on any one of fields in the detailed list screen, the control portion recognizes a job corresponding to the any one of the fields thus touched as a selected job, and when the cancellation key has been operated in a state where the job is selected, without executing the selected job, the control portion performs control so that data corresponding to the selected job is erased.

7. The display input device according to claim 1, wherein after the drag operation, the control portion performs control so that the drag screen is displayed in such a manner as to be retracted in a sliding manner to the end side on the start region side, so that as a return amount of a touch position moved to be returned to a start region direction increases, the display panel gradually decreases a display area of the drag screen, and when the touch position has been returned to the start region or when a touch has been released before arriving at the end region, the control portion controls the display panel to stop displaying the drag screen.

8. An image formation device, comprising:
the display input device according to claim 1;
a storage portion that stores data; and
a power source device that supplies power to the display input device and the storage portion,
wherein
upon recognizing the power-off command, the control portion controls the storage portion to perform shutdown processing that is processing for protecting stored data, and
after completion of the shutdown processing, the power source device cuts off power supply to each portion power supply to which is to be cut off at a time of power-off.

9. A method for controlling a display input device, comprising steps of:
controlling a display panel to display a setting screen and keys;
recognizing, based on an output of a touch panel portion provided with respect to the display panel, a content of an operation performed by a user;
recognizing a drag operation in which a touch is made on a predetermined start region in a display region of the display panel, and while the touch is maintained, a touch position is moved in a sliding manner toward a predetermined end region that is distant from the start region;
recognizing, as a power-off command to turn off power, an arrival of the touch position at the end region as a result of continuing the drag operation; and
upon recognizing the power off command, performing processing for power-off;
providing the start region so as to be in contact with any one of end sides of the display region of the display panel;
providing the end region so as to be in contact with one of the end sides of the display region of the display panel which is opposed to the any one of end sides of the display region;
when the drag operation has been performed after a touch had been made on the start region, displaying a drag screen as superimposed on a screen being displayed in the display panel; and
by displaying the drag screen in such a manner as to be dragged out in a sliding manner from the end side on the start region side toward an end region direction, gradually increasing a display area of the drag screen as a movement amount of a touch position from a start of the touch on the start region toward the end region direction increases.

* * * * *